United States Patent [19]

Woolaway, II

[11] Patent Number: 5,925,883
[45] Date of Patent: Jul. 20, 1999

[54] STARING IR-FPA WITH CCD-BASED IMAGE MOTION COMPENSATION

[75] Inventor: James T. Woolaway, II, Goleta, Calif.

[73] Assignee: Raytheon Company, Lexington, Mass.

[21] Appl. No.: 08/900,408

[22] Filed: Jul. 25, 1997

[51] Int. Cl.$^6$ .................................................. G01J 5/20
[52] U.S. Cl. ...................... 250/370.08; 250/332; 348/311
[58] Field of Search .............................. 250/370.08, 332; 250/338.4; 348/216, 311

[56] References Cited

U.S. PATENT DOCUMENTS

| | | |
|---|---|---|
| 4,093,957 | 6/1978 | King et al. .......................... 250/370.08 |
| 4,385,321 | 5/1983 | Malm . |
| 4,390,791 | 6/1983 | Hatanaka et al. . |
| 4,405,857 | 9/1983 | Hirai et al. . |
| 4,445,117 | 4/1984 | Gaalema et al. . |
| 4,495,409 | 1/1985 | Baji et al. . |
| 4,786,831 | 11/1988 | Morse et al. . |
| 4,956,716 | 9/1990 | Hewitt et al. . |
| 5,043,820 | 8/1991 | Wyles et al. . |
| 5,083,016 | 1/1992 | Wyles et al. . |
| 5,155,597 | 10/1992 | Lareau et al. . |
| 5,453,781 | 9/1995 | Stein . |
| 5,563,405 | 10/1996 | Woolaway, II et al. . |
| 5,659,315 | 8/1997 | Mandl ..................................... 341/143 |
| 5,717,208 | 2/1998 | Woolaway, II ........................... 250/332 |

OTHER PUBLICATIONS

"E–O framing camera flight test results", Andre G. Lareau et al., Airborne Reconnaissance XVIII, SPIE, vol. 2272, pp. 133–141, Jul. 1994.

"Electro–optical imaging array with motion compensation", Andre G. Lareau et al. Airborne Reconnaissance XVII, SPIE, vol. 2023, pp. 65–79, Jul. 1993.

*Primary Examiner*—Constantine Hannaher
*Assistant Examiner*—Darren M. Jiron
*Attorney, Agent, or Firm*—W. C. Schubert; G. H. Lenzen, Jr.

[57] ABSTRACT

An IR focal plane array (IR-FPA) includes an IR radiation detector (11a) having a plurality of IR radiation responsive photodetectors (PDs) and a readout integrated circuit (11) that includes a plurality of unit cells arranged in an N×M matrix. Each unit cell has an input coupled to an output of one of the IR radiation responsive photodetectors. The IR-FPA further includes M column amplifiers, preferably CTIAs, individual ones of which have an input that is coupled through one of N switches ($\phi$tr) to individual ones of the N unit cells. A charge integrating capacitance in each unit cell is formed by a charge well underlying one ($\phi_1$) of a plurality of transfer gates coupled between individual ones of the N unit cells that are coupled to one of the M column amplifiers. The plurality of transfer gates are a multiphase CCD, preferably a four phase CCD, and are clocked at a rate that is a function of a rate of scene image motion relative to a radiation receiving surface (10a) of the IR-FPA for transferring photodetector-generated charge packets from one row to a next, adjacent row during an integration period. In a further embodiment the M columns are partitioned into j column groups, wherein all transfer gates within one of the j column groups are clocked at a rate that is a function of a rate of scene image motion relative to the column group.

20 Claims, 4 Drawing Sheets

FIG. 4.
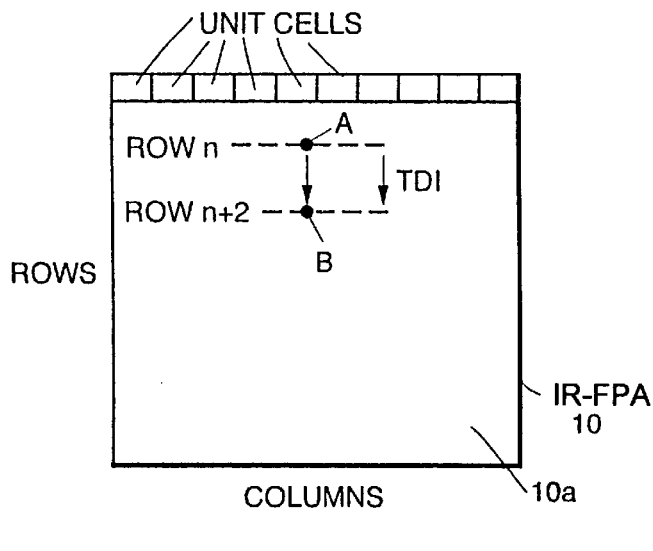
FIG. 9.
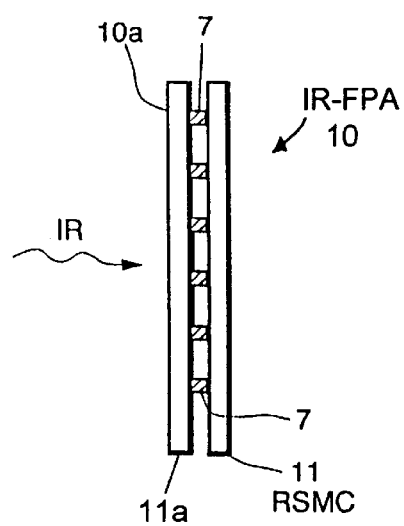
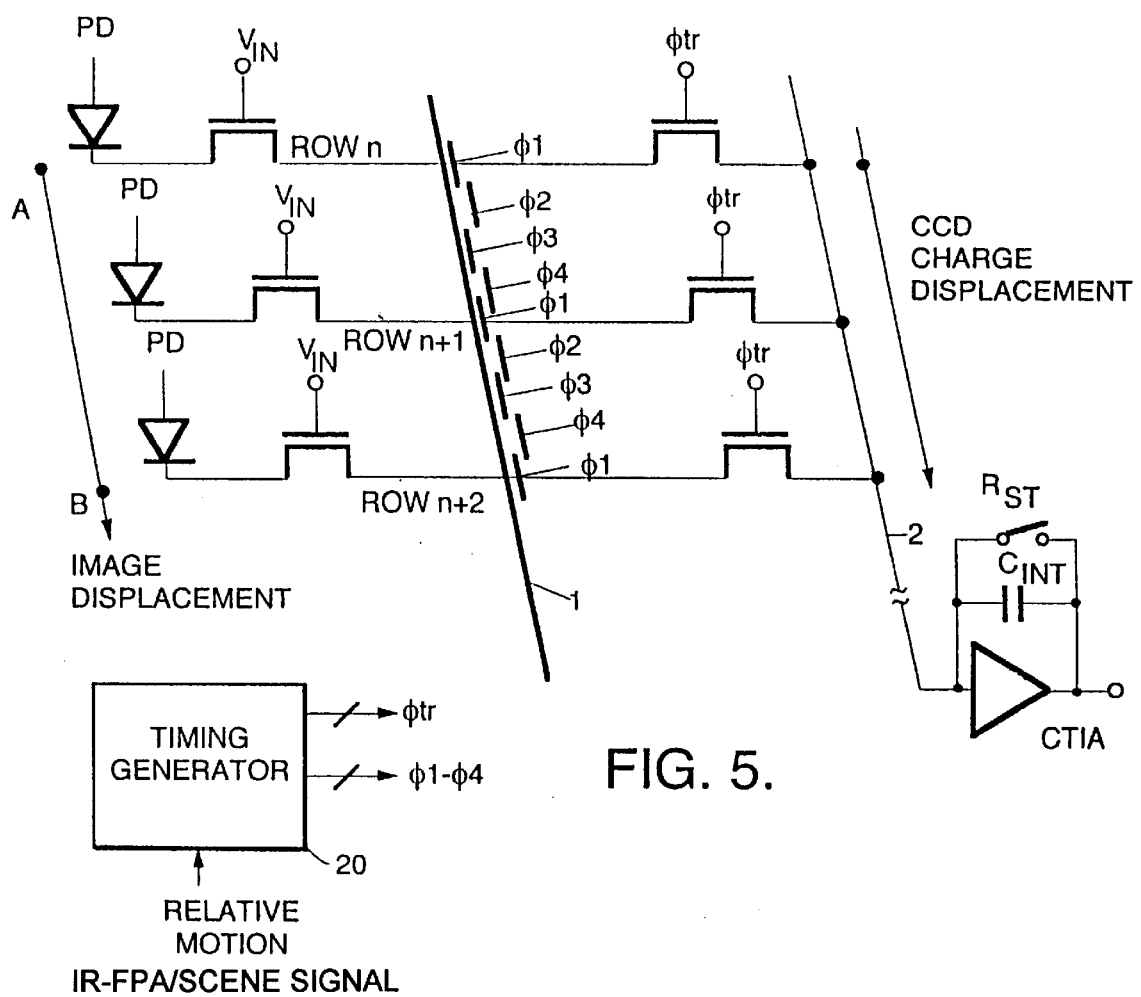
FIG. 5.

STARING IR-FPA WITH CCD-BASED IMAGE MOTION COMPENSATION

FIELD OF THE INVENTION

This invention relates generally to detectors of electromagnetic radiation and, in particular, to staring infrared (IR) radiation detector focal plane arrays (FPAs).

BACKGROUND OF THE INVENTION

Charge Coupled Devices (CCDs) are well known detectors of optical radiation, typically visible radiation. A number of imaging devices and cameras have successfully employed CCD arrays to generate charge packets representing the optical energy arriving from a scene. FIG. 1 illustrates a conventional four phase CCD readout structure. By successively applying the proper potentials to a plurality of transfer gates ($\phi 1-\phi 4$) a given charge packet can be moved through a conductive transfer line 1, and thus from a location where the charge packet is created to a location where the charge packet is detected.

A so-called staring IR-FPA includes a two dimensional array of IR photodetectors that is arranged in a row and column matrix. The staring IR-FPA can be contrasted to a scanned-type of IR-FPA, wherein a rotating mirror or some similar mechanism scans a scene image across the IR-FPA. Incident IR radiation arriving from the scene is converted by each photodetector to charge and integrated within an associated discrete unit cell.

Referring to FIG. 2, in a typical embodiment of an N row by M column staring IR-FPA, each column of unit cells is provided with a column amplifier (CA), such as a capacitive transimpedance amplifier or CTIA. A first set of transistors (connected to a potential ($V_{IN}$)) are controlled to properly bias the unit cell photodetector (PD), while a second set of transistors which function as switches (connected to timing signals transfer-phase or $\phi$tr) are used to sequentially and individually connect N unit cells along a given column to a column sense or readout line 2 that is connected to the column's CA. The column CAs may read out all of the unit cells in parallel across a given one of the N rows, and then output a signal having a magnitude that is indicative of the IR radiation that was detected by the associated unit cell. This process continues until all N rows have been readout, thus forming an image frame. During an integration period, before readout, the detected current ($I_{det}$) is integrated on a unit cell capacitance ($C_{int}$). For a CTIA embodiment the column amplifier includes an integration capacitance and a solid state switch for periodically resetting the integration capacitance.

Due at least in part to the use of the CTIA, the circuitry of FIG. 2 will generally have a higher charge transfer efficiency (CTE) than the CCD detector, and is often preferred for low light level and thermal imaging applications.

Reference in this regard can be had, by example, to commonly assigned U.S. Pat. No. : 4,786,831, "Integrating Capacitively Coupled Transimpedance Amplifier", by Morse et al.; U.S. Pat. No. 4,956,716, "Imaging System Employing Charge Amplifier", by Hewitt et al.; U.S. Pat. No. 5,043,820, and "Focal Plane Array Readout Employing One Capacitive Feedback Transimpedance Amplifier for Each Column", by Wyles et al. The disclosures of these various patents are incorporated by reference herein in their entireties.

It is known in the art to operate a FPA in a Time Delay and Integrate (TDI) mode. By example, due to rotation of a platform that contains the FPA, a scene being viewed, such as a star, is periodically swept across the FPA. This results in a corresponding motion of the charge image across the FPA in a row-by-row fashion along a TDI "on-track" direction. Reference with regard to a TDI system can be had to, by example, commonly assigned U.S. Pat. No. : 5,453,781, "Apparatus and Method for Minimizing Velocity-Mismatch MTF Degradation in TDI Systems", by J. T. Stein. The disclosure of this U.S. Patent is incorporated by reference herein in its entirety.

It is known in the art to employ a CCD-type of visible light imaging array to view a moving scene. Reference in this regard can be had to U.S. Pat. No. : 5,155,597, "Electro-Optical Imaging Array with Motion Compensation", by Lareau et al. This patent describes an array having photosensitive cells that are arranged into one or more column groups. Charge packets collected in the cells are transferred down a column at the same rate as image motion in the plane of the array. Each column group may have its own charge transfer rate corresponding to the image motion rate of that column group. FIGS. 6 and 7 of this patent illustrate an isolated column group, and show the use of a three phase clock that is provided to all rows of the column group. Reference in this regard can also be had to the following two publications: "Electro-optical imaging array with motion compensation", SPIE Vol. 2023 Airborne Reconnaissance XVII (1993), pgs. 65–79, by A. G. Lareau; and "E-O framing camera flight test results", SPIE Vol. 2272 Airborne Reconnaissance XVIII (1994), pgs. 133–141, by A. G. Lareau and M. R. Brown.

It can be appreciated that it would be desirable to be able to image a scene in the IR radiation band with a staring type of FPA, wherein the scene is moving with resect to the IR-FPA, and to provide image motion compensation using a CCD. The prior art discussed above does not adequately address this need.

OBJECTS AND ADVANTAGES OF THE INVENTION

It is a first object and advantage of this invention to provide a staring-type IR-FPA having an image motion compensation function.

It is a second object and advantage of this invention to provide a staring-type IR-FPA having an image motion compensation function that enables different motion rates to be compensated across the IR-FPA.

It is a further object and advantage of this invention to provide an IR-FPA having a plurality of unit cells arranged in rows and columns, wherein each column is coupled to a CCD for transferring charge between adjacent rows of a column.

It is another object and advantage of this invention to provide an IR-FPA having a plurality of unit cells arranged in rows and columns, wherein each column is coupled to a CCD, and wherein generated charge resulting from incident IR radiation is integrated in a CCD charge well.

It is one further object and advantage of this invention to provide an IR-FPA that comprises a plurality of column CTIAs that provide a high charge transfer efficiency, in combination with a CCD structure that provides TDI motion compensation, wherein an IR radiation detector integrated circuit is hybridized with a readout integrated circuit, that includes the CCD structure, to form an improved IR-FPA.

SUMMARY OF THE INVENTION

The foregoing and other problems are overcome and the objects of the invention are realized by methods and apparatus in accordance with embodiments of this invention.

In a first aspect this invention teaches an IR radiation responsive sensor assembly or IR-FPA that includes an IR detector integrated circuit, having a plurality of IR photodetectors arranged in an N×M matrix, and a readout integrated circuit that includes a plurality of unit cells arranged in an N×M matrix. Each unit cell is coupled to an output of one of the IR photodetectors. The unit cells are also coupled to a readout structure that includes M column amplifiers, preferably CTIAs, individual ones of which have an input that is coupled through one of N switches to individual ones of N unit cells.

In accordance with this invention there is a charge integrating capacitance, associated with each of the unit cells, that is comprised of a charge well underlying one of a plurality of transfer gates that are coupled between individual ones of the N unit cells coupled to one of the M column amplifiers. The transfer gate that overlies the charge well is disposed between the output of the photodetector and a corresponding one of the N switches. The plurality of transfer gates are comprised of a multiphase CCD, preferably a four phase CCD.

The plurality of transfer gates are clocked at a rate that is a function of a rate of scene image motion relative to a radiation receiving surface of the IR-FPA for transferring photodetector-generated charge packets from one row to a next, adjacent row during a time that the N switches are open (i.e., during an integration period).

In a further embodiment the M columns are partitioned into j column groups, wherein all transfer gates within one of the j column groups are clocked at a rate that is a function of a rate of scene image motion relative to the radiation receiving surface of the IR-FPA within the column group.

In accordance with a method of operating an IR-FPA, the following steps are executed: (a) providing an array of unit cells arranged in an N×M matrix, each of the unit cells having an input coupled to an output of an IR radiation responsive photodetector; (b) during an integration period, successively detecting IR radiation emanating from a point in a scene with individual ones of a plurality of adjacently disposed photodetectors, the point in the scene having a relative motion with respect to a radiation receiving surface of the IR-FPA; and (c) successively integrating resulting photodetector currents in a corresponding plurality of adjacently disposed unit cells, the step of integrating including a step of transferring a partially integrated photodetector current from one unit cell to an adjacently disposed unit cell, then reading out the result of the integration and transferring charge to a column amplifier, preferable a CTIA.

In a presently preferred embodiment of this invention the IR-FPA includes an IR radiation detector integrated circuit that is hybridized with a readout and scene motion compensation integrated circuit, enabling both the IR detector and the readout integrated circuits to be separately optimized for their intended functions. The IR detector and the readout integrated circuits may be hybridized using a plurality of electrically conductive contacts, preferably indium bumps. However, monolithic IR detector/readout circuit IR-FPA embodiments are also within the scope of the teaching of this invention.

BRIEF DESCRIPTION OF THE DRAWINGS

The above set forth and other features of the invention are made more apparent in the ensuing Detailed Description of the Invention when read in conjunction with the attached Drawings, wherein:

FIG. 4 is a front view of the IR-FPA and is useful in understanding the image motion compensation function;

FIG. 5 illustrates the effect of image displacement and CCD charge displacement in the IR-FPA of FIG. 3;

FIG. 9 is a side view of an IR-FPA that is hybridized with a readout and scene motion compensation circuit in accordance with a preferred embodiment of this invention.

DETAILED DESCRIPTION OP THE INVENTION

Figure 1:
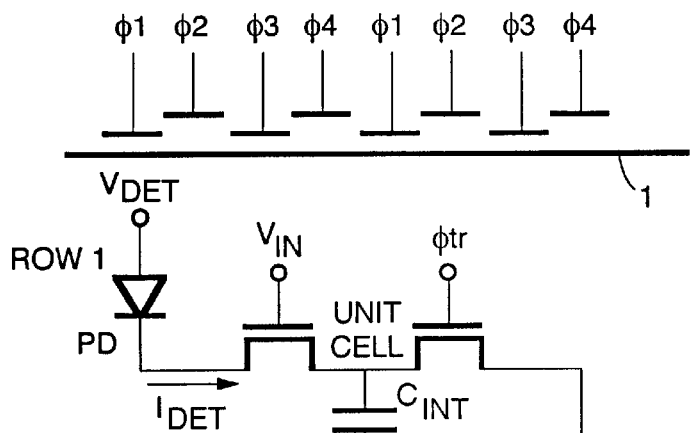
FIG. 1 illustrates a conventional four phase CCD readout structure.
Figure 2:
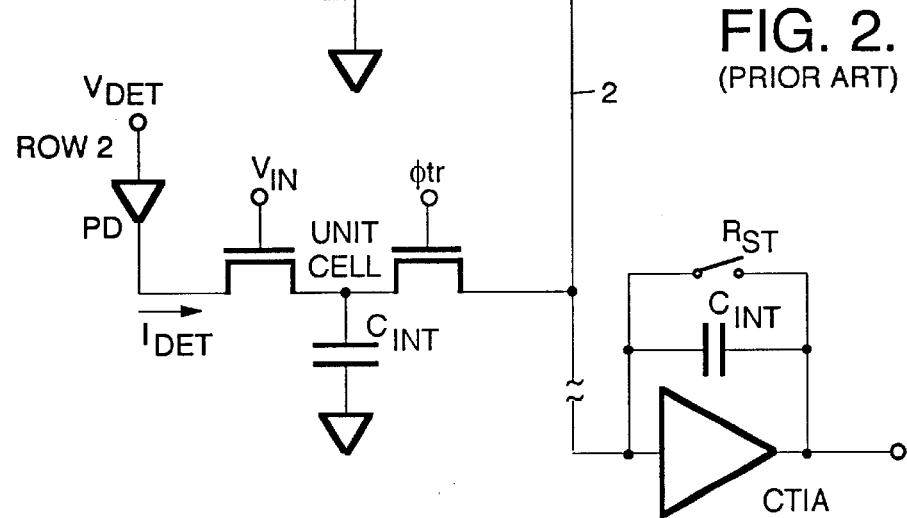
FIG. 2 illustrates two conventional IR detector unit cells.
Figure 3:
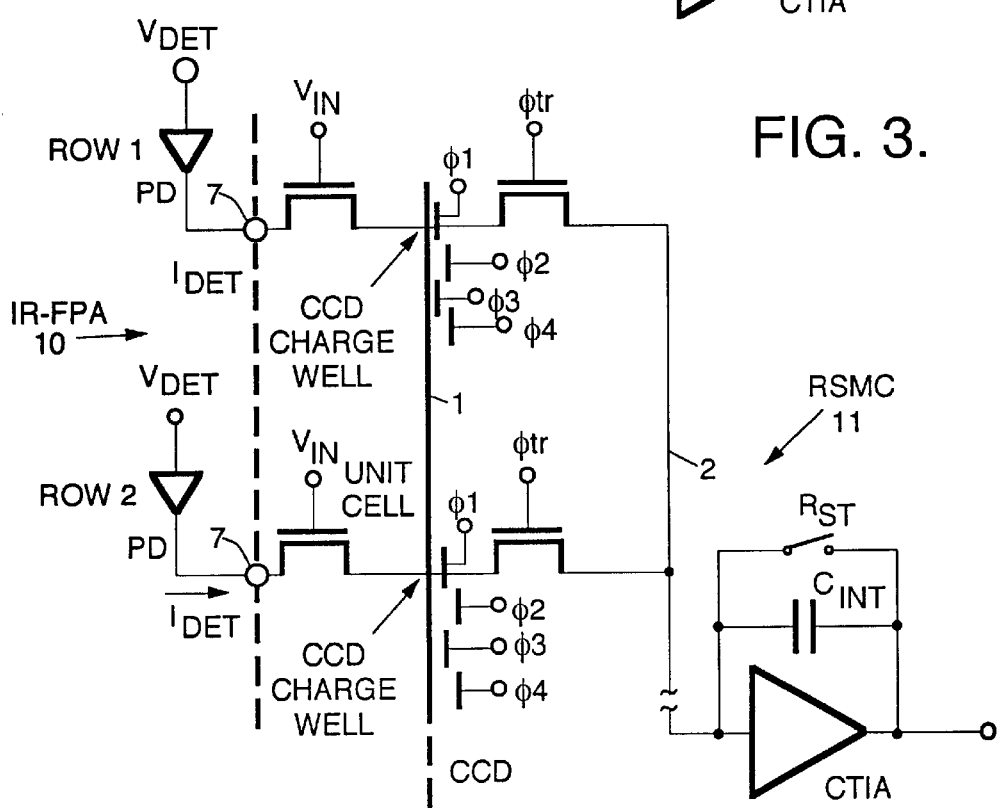
FIG. 3 illustrates two IR detector unit cells that are constructed in accordance with this invention to include a CCD readout structure.

FIG. 3 illustrates two photodetectors (PD) from rows 1 and 2 of one column of an IR radiation detector integrated circuit 11a that forms a part of a staring IR-FPA 10 in accordance with this invention. It should be realized that there may be an arbitrary number of rows (e.g., 64), and an arbitrary number of columns (e.g., 128). Each PD of a column is coupled via interconnects 7, such as indium bumps, to a readout and scene motion compensation (RSMC) integrated circuit 11. The unit cells of the RSMC 11 are connected to an associated column amplifier, preferably a CTIA, as described previously. In the RSMC 11 of this invention the unit cell integration capacitance $C_{int}$ is eliminated as a discrete component, and instead is replaced by a charge well that underlies a φ1 transfer gate of a four phase CCD. The CCD is thus used to both integrate $I_{det}$ and to transfer the integrated charge from row-to-row during the integration period, under the control of the four phase CCD clock. The four phase CCD clock is controlled so that the rate of charge transfer from row-to-row is a function of the rate of scene image motion at the plane of the IR-FPA 10. The number of samples per dwell in the TDI direction can be increased by increasing the number of bits in the in-cell TDI register, where one bit is comprised of one set of CCD clocks (φ1–φ4).

The IR radiation detector 11a of the IR-FPA 10 may be constructed of a Group II–VI material, such as HgCdTe, and may be sensitive to IR radiation within one or more spectral bands of interest. As employed herein Short Wavelength Infrared (SWIR) radiation is considered to include a spectral region extending from approximately 1000 nm to approximately 3000 nm. Medium Wavelength Infrared (MWIR) radiation is considered to include a spectral region extending from approximately 3000 nm to approximately 8000 nm. Long Wavelength Infrared (LWIR) radiation is considered to include a spectral region extending from approximately 7000 nm to approximately 14000 nm. Very Long Wavelength Infrared (VLWIR) radiation is considered to include a spectral region extending from approximately 12000 nm to approximately 30000 nm. Although the bands overlap to some extent, for the purposes disclosed herein the overlap is not considered to be significant. The semiconductor material that comprises the IR-FPA 10 is considered to exhibit significant responsivity to a given spectral band if the semiconductor material exhibits a maximum or substantially maximum photosensitivity to wavelengths within the given spectral band.

The RSMC 11 is preferably constructed from silicon, and the CCD, CTIA, and associated switches are fabricated in the silicon. Referring briefly to FIG. 9, the two integrated circuits (i.e., IR radiation detector array 11a and RSMC 11) are joined or hybridized together using, by example, the indium bumps 7, solder bumps, or any suitable electrically conductive coupling means, thus forming the IR-FPA 10. This enables each integrated circuit to be separately optimized for its intended function, and to then be electrically connected prior to operation. It is, however, within the scope of this invention to provide a monolithic embodiment, wherein some or all of the circuits of the RSMC 11 are fabricated in the IR radiation detector 11a.

Figure 8:
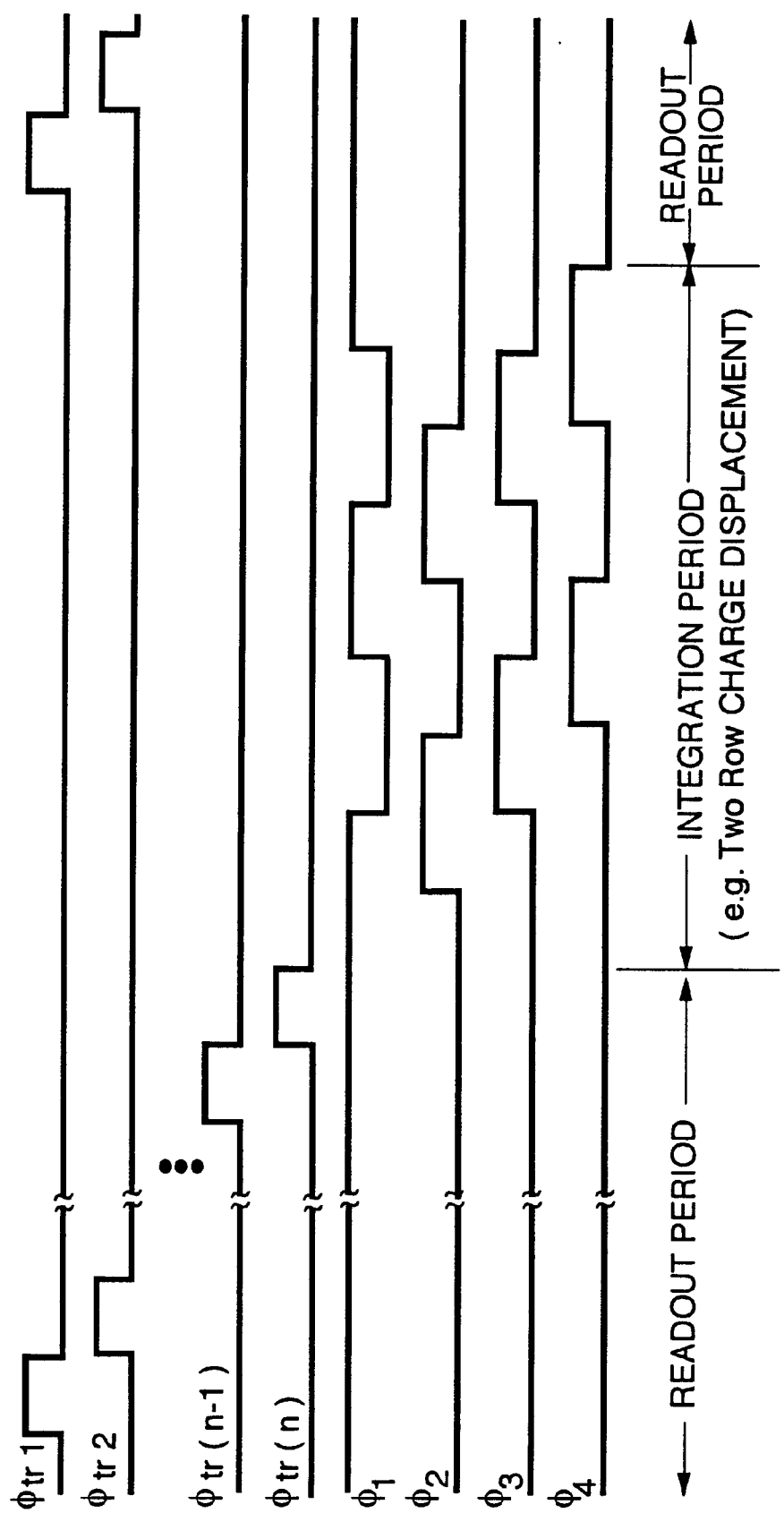
FIG. 8 is an exemplary timing diagram illustrating the operation of the IR-FPA of this invention.

In FIG. 3 the photodiodes PD are shown connected for a case wherein an n-channel CCD is used. If a p-channel CCD is employed instead then the orientation of the PDs is reversed. FIG. 4 illustrates the motion compensation feature in accordance with this invention. An image center is located at point "A" on a radiation receiving surface 10a of the IR-FPA 10 at the start of an integration period. During the integration period the image center shifts down (or up) the rows of unit cells (only some of which are shown) due to relative motion between the plane of the radiation receiving surface 10a of the IR-FPA 10 and the scene being imaged. For example, the scene center shifts from row$_n$ to row$_{n+2}$. At the end of the integration period the scene center is located at the point designated as "B". Referring also to FIGS. 5 and 8, during the integration period the four phase CCD clocks for all of the columns (or groups of columns) are activated by a timing generator 20 so as to shift the integrated charge from row$_n$ to row$_{n+2}$ at the same rate as the relative motion between the IR-FPA and the scene. It is desirable to make the rate of charge displacement as nearly equal as possible to the rate of scene image displacement. The relative motion between the IR-FPA 10 and the scene, and hence the rate of image displacement, can be obtained from, by example, angular rate sensors, accelerometers, etc. that are coupled to a platform to which the IR-FPA 10 is attached, such as a satellite or an aircraft. The displacement indicating circuit or unit generates a rate signal that is indicative of the relative motion between the IR-FPA 10 and the scene. The rate signal is input to the timing generator 20, as depicted in FIG. 5. At the end of the integration period the CCD clocks are stopped, and the signals φtr are applied in succession to each row to read out the integrated charge. In accordance with this invention this causes the integrated charge from each of the CCD charge wells to be coupled, in turn, to the input of the CTIA. This readout process may occur simultaneously in each column of the RSMC 11.

An advantage gained by this technique is that CCD-based TDI scene motion compensation is achieved, while allowing column CTIA charge transfer using the inherent high CTE in an IR-FPA embodiment. It should be noted that the number of CCD stages that the charge packet must pass though, before being input to the CTIA, is a function of the rate of scene motion and the integration period. Since the charge packets are not required to be clocked the entire length of a CCD, as is typically the case in conventional CCD imagers, signal losses are reduced.

Figure 6:
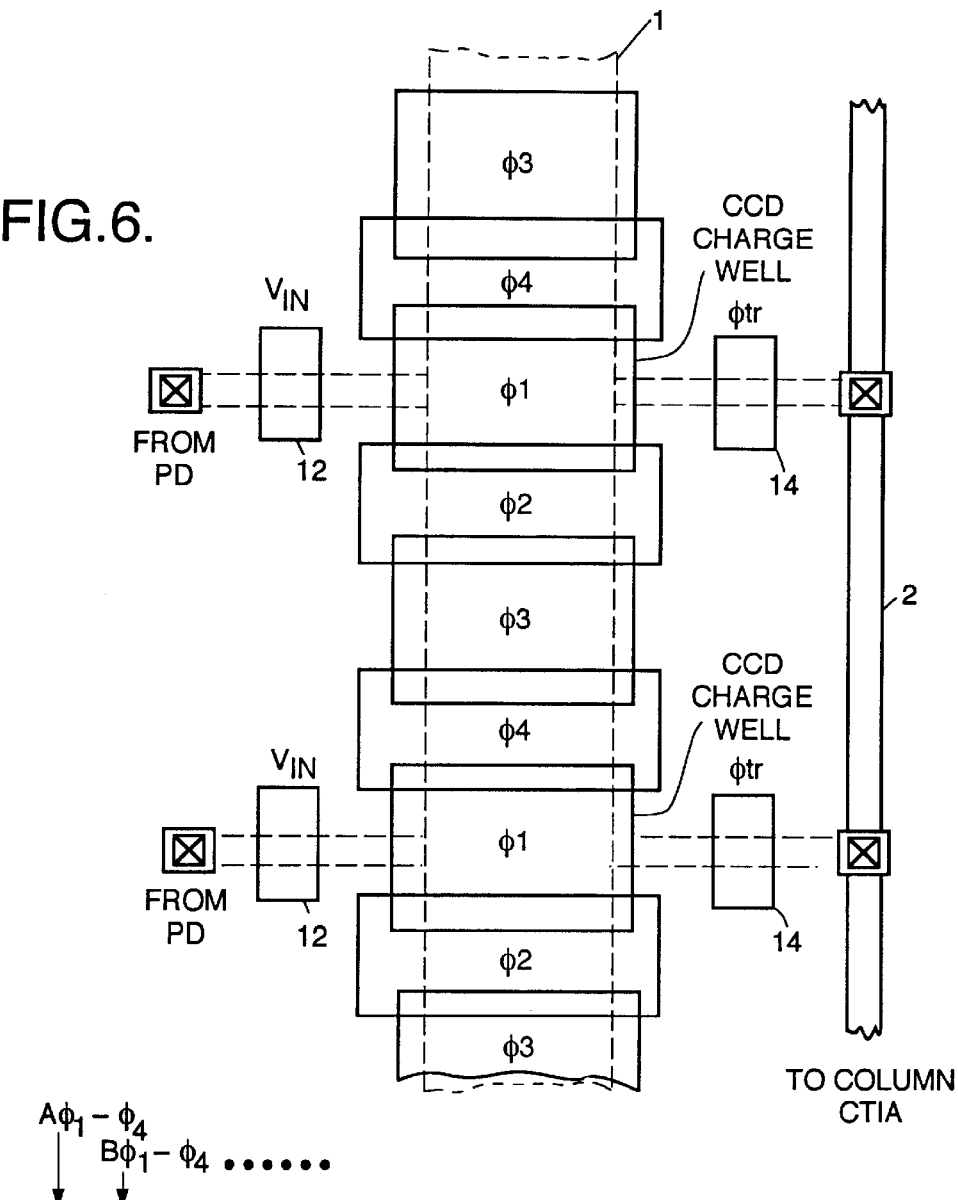
FIG. 6 is a simplified top view of an exemplary unit cell layout to accommodate the CCD readout structure.

FIG. 6 illustrates an exemplary and simplified RSMC 11 layout to accommodate the CCD structure within each unit cell. Two unit cells are shown in FIG. 6, each of which receives an input from an associated photodetector (PD) through the V$_{in}$ gate 12. The charge in each unit cell is transferred to the CTIA readout line 2 through an associated φ$_{tr}$ transfer gate 14. The CCD φ$_1$–φ$_4$ transfer gates are shown to be overlapped and to be sized as a function of the spacing between the unit cells along the column direction. An exemplary center-to-center spacing between the unit cells is 50 micrometers. IR-generated charge is integrated in the CCD charge well that underlies each φ$_1$ transfer gate during the integration period, and the charge originating from a given point in the scene may be integrated in a plurality of such charge wells during a given integration period, assuming that relative motion exists between the plane of the IR-FPA 10 and the scene.

In FIG. 6 the substrate shown in dashed outline may by n$^+$ active, the V$_{in}$ gates 12 may be a polysilicon level 1 (poly1), the φ$_1$ and φ$_3$ gates poly1, the φ$_2$ and φ$_4$ gates poly2, and the φ$_{tr}$ gates 14 poly1. The CTIA transfer line 2 is preferably metal, such as aluminum. In the disclosed embodiment the φ$_3$ stage functions as a separator well.

In the exemplary timing diagram of FIG. 8 it is assumed that an image displacement corresponding to two IR-FPA rows occurs during the integration period. For other image displacement rates more or less groups of φ$_1$–φ$_4$ timing pulses are generated during the integration period. The signal polarities shown in FIG. 8 assume the use of an n-channel CCD. The polarities would be inverted if a p-channel CCD is used.

The V$_{in}$ gate 12 can be used control the integration time as well by changing the bias potential across the associated PD.

Figure 7:
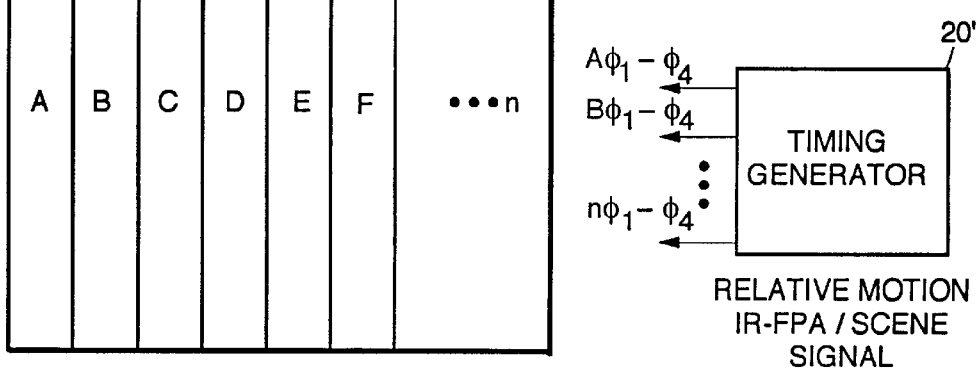
FIG. 7 illustrates a staring IR-FPA having a plurality of different groups of columns, each being provided with independent CCD clocks to compensate for different motion rates.

FIG. 7 illustrates a staring IR-FPA readout integrated circuit 11 having segmented CCDs. In this embodiment some number (A–n) of column groups, where each group includes from 1 to m columns, and where n×m=total number of IR-FPA columns, are each provided by a timing generator 20' with a separate set of independently controlled φ$_1$–φ$_4$ clocks. This embodiment enables each column group to be set to a different motion rate, and is useful when the scene radiation arrives at other than a normal angle to the radiation receiving surface 10a of the IR-FPA 10. At one extreme each IR-FPA column can be clocked at a different rate, enabling motion compensation to be provided on a real-time basis as a function of differential scene motion across the IR-FPA 10.

Although described above in the context of a four phase CCD, more or less than this number of phases could be used, and/or additional samples per TDI dwell can be provided by varying the numbers of bits, as described previously.

While the invention has been particularly shown and described with respect to preferred embodiments thereof, it will be understood by those skilled in the art that changes in form and details may be made therein without departing from the scope and spirit of the invention.

What is claimed is:

1. An IR radiation image sensor, comprising:
   a plurality of unit cells arranged in an N row by M column matrix, each unit cell having an input coupled to an output of one of a plurality of IR radiation responsive photodetectors;
   M column amplifiers individual ones of which have an input that is coupled through one of N switches to an individual one of the N unit cells of one of the N rows; and
   each unit cell is comprised of a charge integrating capacitance, said charge integrating capacitance being comprised of a charge well underlying one of a plurality of transfer gates, said plurality of transfer gates being coupled between two adjacent individual ones of said N unit cells of the N rows that are coupled to the same one of said M column amplifiers, said one of said plurality of transfer gates in each unit cell being disposed between said output of said one of said plurality of IR radiation responsive photodetectors and a corresponding one of said N switches.

2. An IR radiation image sensor as in claim 1, wherein said plurality of transfer gates are comprised of a multiphase CCD.

3. An IR radiation image sensor as in claim 1, wherein said plurality of transfer gates are comprised of a four phase CCD.

4. An IR radiation image sensor as in claim 1, wherein said plurality of transfer gates are clocked at a rate that is a function of a rate of scene image motion relative to a radiation receiving surface of an IR radiation detector, that comprises said plurality of IR radiation responsive photodetectors, for transferring photodetector-generated charge packets from one row to a next, adjacent row during a time that said N switches are open.

5. An IR radiation image sensor as in claim 1, wherein said M columns are partitioned into j column groups, and wherein all transfer gates within one of said j column groups are clocked at a rate that is a function of a rate of scene image motion relative to a radiation receiving surface of an IR radiation detector, that comprises said plurality of IR radiation responsive photodetectors, within said one of said j column groups for transferring photodetector-generated charge packets from one row to a next, adjacent row during a time that said N switches are open.

6. An IR radiation image sensor as in claim 1, wherein said M column amplifiers are each comprised of a capacitance transimpedance amplifier.

7. A method of operating an IR radiation image sensor, comprising the steps of:

providing an array of unit cells arranged in an N×M matrix, each unit cell having an input coupled to an output of an IR radiation responsive photodetector disposed in an IR radiation detector, the array of unit cells including M column amplifiers individual ones of which have an input that is coupled through one of N switches to individual ones of N unit cells;

opening the N switches of all M columns during an integration period;

integrating photodetector-generated charge on a capacitance comprised of a charge well underlying one of a plurality of transfer gates that are coupled between individual ones of the N unit cells that are coupled to one of the M column amplifiers, the one of the plurality of transfer gates in each unit cell being disposed between the output of the photodetector and a corresponding one of the N switches;

clocking the transfer gates at a rate that is a function of a rate of scene image motion relative to a radiation receiving surface of the IR radiation detector for transferring photodetector-generated charge packets from one row to a next, adjacent row during a time that the N switches are open; and at the end of the integration period, sequentially closing the N switches along a given one of the M columns to couple the charge from an associated charge well to the input of the associated column amplifier.

8. A method as in claim 7, wherein the plurality of transfer gates are comprised of a multiphase CCD.

9. A method as in claim 7, wherein the plurality of transfer gates are comprised of a four phase CCD.

10. A method as in claim 7, wherein the M columns are partitioned into j column groups, and wherein the step of clocking clocks all transfer gates within one of the j column groups at a rate that is a function of the rate of scene image motion relative to the radiation receiving surface of the IR radiation detector within the one of the j column groups.

11. A method as in claim 7, wherein the M column amplifiers are each provided as a capacitance transimpedance amplifier.

12. A method of operating staring-type IR radiation image sensor, comprising the steps of:

providing an array of unit cells arranged in an N×M matrix, each of the unit cells having an input coupled to an output of an IR radiation responsive photodetector disposed in an IR radiation detector;

during an integration period, successively detecting IR radiation emanating from a point in a scene with individual ones of a plurality of adjacently disposed photodetectors, the point in the scene having a relative motion with respect to a radiation receiving surface of the IR radiation detector; and integrating resulting photodetector currents in a corresponding plurality of adjacently disposed unit cells, the step of integrating including a step of transferring, during the integration period, a partially integrated photodetector current from one unit cell to an adjacently disposed unit cell.

13. A method as set forth in claim 12, wherein the array of unit cells comprises M column amplifiers individual ones of which have an input that is coupled through one of N switches to individual ones of N unit cells, and further comprising an initial step of:

opening the N switches at the beginning of the integration period;

wherein the step of integrating includes a step of integrating the photodetector current on a capacitance comprised of a charge well underlying one of a plurality of transfer gates that are coupled between individual ones of the N unit cells that are coupled to one of the M column amplifiers, the one of the plurality of transfer gates in each unit cell being disposed between the output of the photodetector and a corresponding one of the N switches;

clocking the transfer gates at a rate that is a function of a rate of the scene image motion relative to the radiation receiving surface of the IR radiation detector for transferring photodetector-generated charge packets from one row to a next, adjacent row during a time that the N switches are open; and at the end of the integration period, sequentially closing the N switches along a given one of the M columns to couple the charge from an associated charge well to the input of the associated column amplifier.

14. A method as in claim 13, wherein the plurality of transfer gates are comprised of a multiphase CCD.

15. A method as in claim 13, wherein the plurality of transfer gates are comprised of a four phase CCD.

16. A method as in claim 13, wherein the M columns are partitioned into j column groups, and wherein the step of clocking clocks all transfer gates within one of the j column groups at a rate that is a function of the rate of scene image motion relative to the radiation receiving surface of the IR radiation detector within the one of the j column groups.

17. A method as in claim 13, wherein the M column amplifiers are each provided as a capacitance transimpedance amplifier.

18. An IR radiation image sensor, comprising:

an IR radiation detector integrated circuit comprised of a plurality of IR radiation responsive photodetectors arranged in an N row by M column matrix;

a readout integrated circuit comprised of a plurality of unit cells also arranged in an N row by M column matrix, said readout integrated circuit being electrically coupled to said IR radiation detector integrated circuit such that an input to each of said plurality of unit cells is coupled to an output of one of said plurality of IR radiation responsive photodetectors;

said readout integrated circuit further comprising M column amplifiers individual ones of which have an input that is coupled through one of N switches to an individual one of the N unit cells of one of the N rows; and each unit cell is comprised of a charge integrating capacitance, said charge integrating capacitance being comprised of a charge well underlying one of a plurality of CCD transfer gates, said plurality of CCD transfer gates forming a multiphase CCD transfer gate arrangement that is coupled between two adjacent individual ones of said N unit cells of the N rows that are coupled to the same one of said M column amplifiers, said one of said plurality of transfer gates in each unit cell being disposed between said output of said one of said plurality of IR radiation responsive photodetectors and a corresponding one of said N switches;

wherein said plurality of CCD transfer gates are clocked at a rate that is a function of a rate of scene image motion relative to a radiation receiving surface of said IR radiation detector integrated circuit for transferring photodetector-generated charge packets from one row to a next, adjacent row during a time that said N switches are open.

19. An IR radiation image sensor as in claim 18, wherein said M columns are partitioned into j column groups, and wherein all CCD transfer gates within one of said j column groups are clocked at a rate that is a function of a rate of scene image motion relative to the radiation receiving surface of said IR radiation detector integrated circuit within said one of said j column groups for transferring photodetector-generated charge packets from one row to a next, adjacent row during a time that said N switches are open.

20. An IR radiation image sensor as in claim 18, wherein said IR radiation detector integrated circuit and said readout integrated circuit are electrically coupled together through a plurality of electrically conductive bumps for forming an IR focal plane array (IR-FPA), individual ones of said electrically conductive bumps coupling an input of one of said unit cells to an output of one of said IR radiation responsive photodetectors.

* * * * *